US011635638B2

(12) United States Patent
Williams Tinajero

(10) Patent No.: US 11,635,638 B2
(45) Date of Patent: Apr. 25, 2023

(54) LENSES COLORED TO APPROXIMATE COLOR OF SKIN IN OCULAR REGION AND METHODS OF MANUFACTURE

(71) Applicant: OcuSkin Solutions, S.P.C., Spokane Valley, WA (US)

(72) Inventor: Lace Williams Tinajero, Spokane Valley, WA (US)

(73) Assignee: OcuSkin Solutions, S.P.C., Spokane Valley, WA (US)

( * ) Notice: Subject to any disclaimer, the term of this patent is extended or adjusted under 35 U.S.C. 154(b) by 351 days.

(21) Appl. No.: 16/840,291

(22) Filed: Apr. 3, 2020

(65) Prior Publication Data

US 2020/0319480 A1 Oct. 8, 2020

Related U.S. Application Data

(60) Provisional application No. 62/830,097, filed on Apr. 5, 2019.

(51) Int. Cl.
*G02C 7/10* (2006.01)
*B29D 11/00* (2006.01)

(52) U.S. Cl.
CPC ........ *G02C 7/108* (2013.01); *B29D 11/00913* (2013.01); *G02C 2202/16* (2013.01)

(58) Field of Classification Search
CPC .... G02C 7/108; G02C 2202/16; G02C 7/102; G02C 7/16; B29D 11/00913
USPC ...................................................... 351/41, 44
See application file for complete search history.

(56) References Cited

U.S. PATENT DOCUMENTS

| 5,191,897 A | 3/1993 | Meshel |
| 5,953,703 A | 9/1999 | Takeuchi et al. |
| 6,505,935 B2 * | 1/2003 | Ayoub ..................... B24B 9/14 351/44 |
| 2003/0011742 A1 | 1/2003 | Ayoub |
| 2005/0190341 A1 | 9/2005 | Russomagno et al. |
| 2006/0230553 A1 | 10/2006 | Thullen et al. |

(Continued)

FOREIGN PATENT DOCUMENTS

| CA | 2285142 A1 | 4/2001 |
| CA | 2596466 A1 | 2/2009 |

(Continued)

OTHER PUBLICATIONS

PCT Search Report and Written Opinion dated Jul. 2, 2020 for PCT Application No. PCT/US20/26755, 10 pages.

(Continued)

*Primary Examiner* — Tuyen Tra
(74) *Attorney, Agent, or Firm* — Lee & Hayes, P.C.

(57) ABSTRACT

A device and method of making the device is described. In some implementations, an eyeglass lens is colored so that it is semi-opaque or opaque and approximates the color of a particular user's skin. In an example, the lens can be colored by placing an adhesive material on the front or rear surface of the lens. In an additional or alternative example, the lens can be colored by dyeing the lens material. In an additional or alternative example, the lens can be colored by painting the lens material. The colored lens blocks the view of passersby of the ocular region of the wearer and is itself inconspicuous because the approximate skin color camouflages its presence.

20 Claims, 8 Drawing Sheets
(6 of 8 Drawing Sheet(s) Filed in Color)

(56) References Cited

U.S. PATENT DOCUMENTS

2008/0221674 A1  9/2008  Blum
2018/0126116 A1  5/2018  White
2019/0073986 A1  3/2019  Broz et al.

FOREIGN PATENT DOCUMENTS

WO      2009/015489 A1    2/2009
WO      WO2009015489 A1   2/2009
WO      WO2017074444 A1   5/2017

OTHER PUBLICATIONS

Extended European Search Report dated Dec. 14, 2022 for European Patent Application No. 20782773.4, 8 pages.

* cited by examiner

LENSES COLORED TO APPROXIMATE COLOR OF SKIN IN OCULAR REGION AND METHODS OF MANUFACTURE

RELATED APPLICATIONS

This application claims priority to U.S. Provisional Patent Application No. 62/830,097, filed on Apr. 5, 2019, the entire contents of which are incorporated herein by reference.

BACKGROUND

Ocular morbidity, with or without visual impairment, affects people world-wide despite age, gender, or geographic region, though studies indicate it is more prevalent in low-income countries. A broad range of eye diseases, traumatic injuries, cancer, bone dysplasia, and tumor disorders such as neurofibromatosis can lead to ocular morbidity. Those with ocular morbidity or with an otherwise damaged or malformed ocular region endure psychological-social stressors when the ocular morbidity is perceptible by others. Strangers may stare. Children may ask questions or tease. Often the morbidity can be fixed only with a costly solution, if a solution is available at all.

To avoid the unwanted attention, these people often use some sort of eye covering that blocks others' view of their ocular region, or they opt for cosmetic surgery or prosthetic eyes in an effort to normalize their appearance.

For example, in some situations in which an eye is absent, a prosthetic eye has conventionally been used as a cosmetic option. Prosthetic solutions can include silicone orbital prostheses and/or glasses-retained orbital prostheses. However, conventionally, plastic conformers or expanders may need to be used for a long time to ready the eye socket for the prosthetic eye. Additionally, 3D-printed prosthesis technology exists. However, not all people are candidates for prostheses due to morbidity of the socket (e.g., protrusion or irreversible complications and damage done by previous surgeries, etc.). And not all people achieve a normal-looking appearance with cosmetic surgery or an orbital prosthesis, nor is every patient a candidate for surgery or a prosthesis. Multiple surgeries may be required for a prosthesis (e.g., attempting a skin graph to extend a lid that was shortened too much and/or debulking untreatable tumors), with no guarantee of the desired outcome for a normal appearance. Moreover, prosthetics simply do not work for certain people or are unavailable to them.

Cosmetic surgery can also be used to create a more typical look, but cosmetic surgery can be costly and often does not adequately improve a user's appearance, resulting in the need for another solution to shield an ocular region.

Conventionally, the means available for covering ocular regions, even while they may succeed in that task, have not succeeded in not drawing attention to the wearer. For example, eye patches that cover the ocular region and strap around the head and eye patches that adhere to the ocular region (or adhere to eyeglasses atop the ocular region) have commonly been used. The patches typically contrast with the wearer's skin color and therefore stand out. Eye patches can also be uncomfortable to wear, especially adhesive eye patches that cause pain, discomfort, rash, skin irritation, and marks.

Blackening one optical lens of eyeglasses to cover a damaged or malformed ocular region is another traditional solution, but this option, too, can draw attention when one lens of the glasses is transparent, and the other lens is black. Another conventional product is a "fogged out" lens, which is a milky-white color that can also be conspicuous. Frosting one optical lens of eyeglasses is another traditional solution, but this option, too, draws unwanted attention when one lens is transparent and the other is frosted.

Other conventional eye covers include adhesive occlusion foils for treating amblyopia that are thin, flexible, static vinyl, with a graded opaque-to-translucent color scheme. The conventional foils are designed to equalize the spatial contrast of the dominant eye to that of the amblyopic eye. However, the conventional foils are not color-matched to skin. There are vision-occluding eyeglass patches that are meant to treat visual impairment that have decorative indicia applied to a surface. The decorative indicia is visible to others, but the decoration draws unwanted attention to the ocular region.

Additionally, clip-on lens covers can be clipped to eyeglasses. However, the clip-on lens covers are pre-cut and have visible clips, and their color does not approximate many skin colors. Moreover, clip-ons look unnatural and draw attention to an area attempting to look discrete.

Eye shields are also available. However, conventional eye shields are bulky when attached to foam and uncomfortable when pressed to the eye when there is no foam.

For at least these reasons, a person who chooses to cover an ocular region still attracts unwanted attention, having merely traded a conspicuous ocular region for a conspicuous cover for the ocular region. Social pressures such as staring, questions, teasing, and bullying persist. A solution to this problem is necessary, both to promote psychological well-being and to improve social acceptance.

Therefore, there is a demand for a means to conceal damaged or malformed eyes or eye sockets that itself does not draw attention to the wearer. A natural-looking cover can draw people's attention more toward the wearer's normal-looking eye by shifting the focus away from the compromised ocular region. There is a need for a cover for the ocular region that is safe, inconspicuous, effective, comfortable, and easy to make and use, and that can be a temporary or long-term solution depending on an individual user's needs.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description that follows is described with reference to non-limiting and non-exhaustive examples shown in the accompanying figures. In the figures, the left-most digit(s) of a reference number identifies the figure in which the reference number first appears. The same reference numbers in different figures indicate similar or identical items.

FIG. 1C is a front view of a conventional product that has been used to cover the ocular region.

DETAILED DESCRIPTION

Overview

Figure 1A:
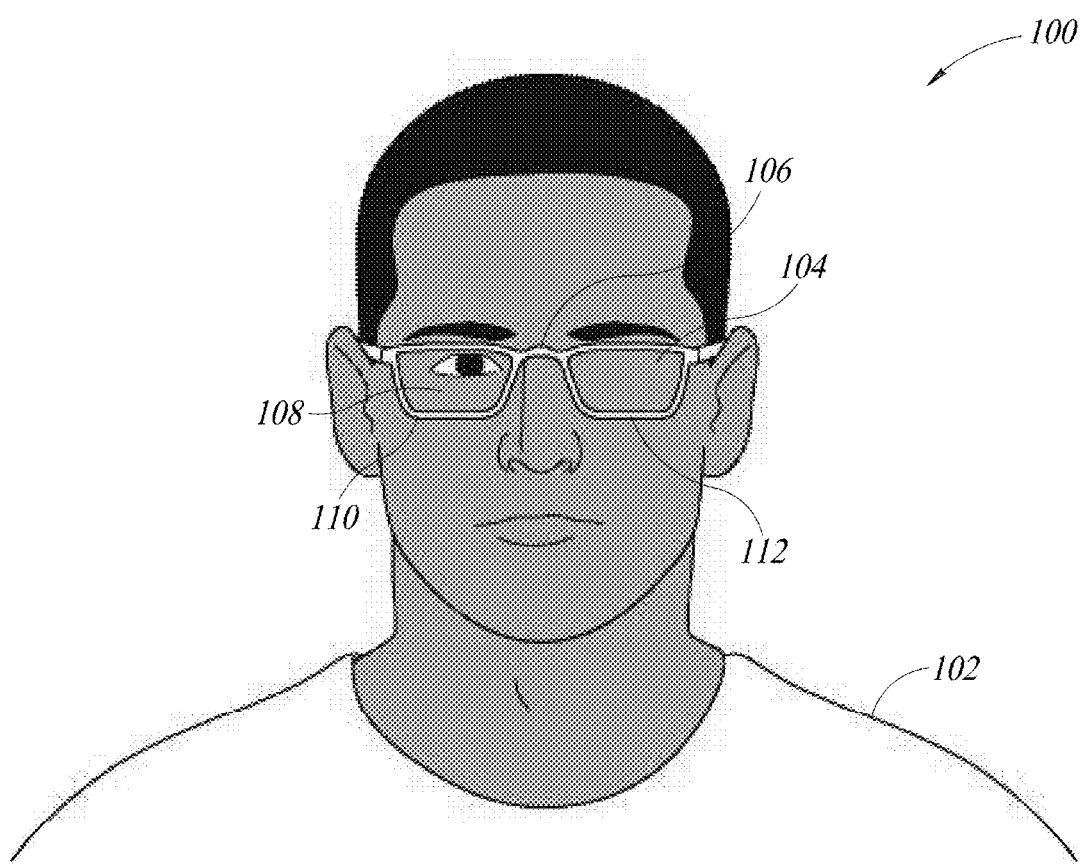
FIG. 1A is a color illustration of a front view of an occluder, according to various examples described herein, included in eyeglasses worn by a subject with a first skin color.

This disclosure describes a device and methods of manufacture of the device.

In examples, this disclosure describes a device that can be inserted into a rim of eyeglasses to block or substantially impair others' view of an ocular region of a subject wearing the eyeglasses. The device (alternatively referred to herein as an "occluder") is made inconspicuous by substantially matching the skin color of the subject. The occluder comprises a lens and a coloring agent.

"Subject," "user," "wearer," and "patient" as used herein means a person with an ocular region that is covered or is to be covered with an occluder according to examples herein.

"Eyeglasses" as used herein means a device including a pair of lenses set into a frame. In some examples, "eyeglass frame" means eyeglasses without the lenses and/or without the occluder. In some examples, "lens" as used herein means a curved piece of material (e.g., glass, plastic, polycarbonate, etc.) or combination of materials (e.g., glass, plastic, polycarbonate, etc.) configured to be placed apart from and in front of an ocular region in an eyeglass frame when worn.

As described herein, the color of the occluder both conceals (or substantially conceals) the eye area from others' view and camouflages the occluder itself by blending in with the surrounding skin. This skin-colored occluder is less obtrusive and less noticeable than a cover or patch that is darker or lighter than the subject's face and can create a more typical appearance for the subject. The occluder can be semi-transparent, opaque or semi-opaque, and can be gradient or solid in color, depending on a subject's particular needs. Gradient coloring allows the occluder to match nuanced shading of a person's facial regions including the nose, cheeks, temples, and forehead.

The solution described herein is non-surgical, non-invasive, non-scratching, easily accessible, and inexpensive, and can work for those with traumatic injury to their ocular region, those with congenital diseases, malformation, or bone dysplasia, those with ocular damage from surgery, and others. The solution described herein does not require any direct contact between the skin of the ocular region and the occluder. Moreover, the solution described herein can be made available to people, in examples, the same day they request the occluder; in contrast to many conventional solutions, the solution described herein does not require days, weeks, months, or years to be put in place. The solution provides cosmetic alternatives for patients waiting for surgical/medical solutions of alternatives and for where surgical/medical solutions do not yet exist. The solution described herein can ultimately enhance the quality of life of patients who live with orbital disfigurement and suffer its hardships, regardless of age, gender, skin color, and geographic location.

In a non-limiting example, a person with anophthalmia (absence of at least one eye and ocular tissue from the orbit), could use the innovation of this disclosure if the cosmetic irregularities of this condition are bothersome to them. In other examples, soldiers who suffer damage to their ocular region in combat can use the innovation of this disclosure.

In examples, a lens can be colored by a chemical process to manufacture an occluder. In some examples, the lens can be colored by a chemical process during initial creation of the lens (e.g., during mixing of the lens material when in liquid state). In other examples, the lens can be colored after manufacture of the lens. For instance, after manufacture of the lens, the lens may be submerged in a dye solution such that the dye can be absorbed into already-hardened lens material (e.g., plastic, glass, polycarbonate, etc.).

Additionally and/or alternatively, in examples, to make an occluder, a tinted layer or coating can be added to the surface of a lens after manufacture of the lens. In examples, an occluder can be comprised of paint on one or more surfaces of a lens. A paint that approximates the skin color of the ocular region of the subject can be applied to either surface of the lens, or both surfaces. In examples, the paint can result in an opaque or semi-opaque coating that is of sufficient opacity as to block the view of an ocular region.

Additionally and/or alternatively, in examples, the occluder comprises (1) a lens and (2) one or more layers of skin-colored adhesive material affixed to the one or more surfaces of the lens.

In some examples, the occluder as described herein can be placed in one rim of eyeglasses to occlude an affected side of the face. A transparent lens can be placed in the opposing rim of the eyeglasses on the unaffected side. In some examples, "unaffected" as used herein means not possessing damage or malformity. In an example, the unaffected eye has sight and does not require correction in the unaffected eye's lens. In another example, the unaffected eye has sight and does require correction in the unaffected eye's lens. In examples, the lens on the unaffected side can have a photochromic lens that darkens in the presence of ultraviolet (UV) light. Alternatively, in examples, the lens on the unaffected side can have a monochromic lens that does not change color. In another example, both eyes may be affected and occluders can be placed in front of both eyes (e.g., for a person who is blind).

The occluder as described herein is a safe, non-invasive, non-irritating alternative that avoids direct contact with the wearer's skin, thereby eliminating problems associated with conventional eye coverings that can cause pain, discomfort, rash, and skin irritation upon removal from the skin.

At least for the reasons given above, techniques described herein, and systems described as implementing techniques described herein, are unconventional, non-routine, non-generic, and yield improvements to relevant technologies.

Reference to an "example" in this document does not limit the described elements or features to a single embodiment; all described elements and features may be combined in any embodiment in any number of ways unless otherwise described. Furthermore, for the purposes of interpreting this specification, the use of "or" herein means "and/or" unless stated otherwise. The use of "a" or "an" herein means "one or more" unless stated otherwise. The use of "comprise," "comprises," "comprising," "include," "includes," and "including" are interchangeable and not intended to be limiting. Also, unless otherwise stated, the use of the terms such as "first," "second," "third," "upper," "lower," and the like do not denote any spatial, sequential, or hierarchical order or importance, but are used to distinguish one element from another. It is to be appreciated that the use of the terms "and/or" and "at least one of", for example, in the cases of "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

It should also be appreciated by those skilled in the art that any block diagrams, steps, or sub-processes herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown. The order in which the methods are described are not intended to be construed as a limitation, and any number of the described method blocks can be deleted, moved, added, subdivided, combined, and/or modified in any order to implement the methods, or an alternative combination or sub-combinations. Also, while steps, sub-processes or blocks are at times shown as being performed in series, some steps, sub-processes, or blocks can instead be performed in parallel, or can be performed at different times as will be recognized by a person of ordinary skill in the art. Further any specific numbers noted herein are only examples; alternative implementations can employ differing values or ranges. Furthermore, the methods can be implemented in any suitable hardware, software, firmware, or combination thereof.

FIG. 1A is a color illustration 100 of a front view of an occluder, according to various examples described herein, included in eyeglasses worn by a subject with a first skin color.

In FIG. 1A, subject 102A is shown using an occluder 104A contained within an eyeglass frame 106A. Occluder 104A is held within left rim 112A of eyeglass frame 106A. In the example illustrated, occluder 104A comprises a lens and adhesive material adhered to the lens. Right rim 110A of eyeglass frame 106A contains a non-occluding lens 108A.

FIG. 1A illustrates non-occluding lens 108A as a transparent lens. Non-occluding lens 108A can have a correction or no correction. Non-occluding lens 108A can be monochromic or polychromic. Non-occluding lens 108A can be of any type (e.g., bifocals, scratch-proof coated, etc.).

In some examples, occluder 104A and non-occluding lens 108A may be included in eyeglasses of various types (e.g., various material types, various shapes, partial rims, no rims, etc.) Moreover, in yet other examples, occluder 104A can be included in a monocle, goggles, safety glasses, or other device that positions the occluder on or in front of a subject's ocular region.

In some examples, occluder 104A comprises adhesive material attached to the back surface of the lens, on the surface closer to the face of subject 102A. Additionally or alternatively, the adhesive material can be attached to the front surface of the lens (the surface farther away from the face). FIG. 1A does not illustrate which side of the lens the adhesive material is on. In these examples, the adhesive material is what lends the skin color to occluder 104A. In various examples, the adhesive material is peelable, flexible, trimmable, non-scratching, washable, and/or waterproof, and leaves no adhesive tacky residue on the lens surface.

Adhesive materials that can be used in this example can be made of a type of cellophane that is waterproof or water resistant. This quality (in cellophane or other adhesive material) can deflect tears, rain, snow, or other water forms, and can withstand washing.

Adhesive materials can be acquired that is already the approximate color of a subject's skin, or can be colored (e.g., dyed, marked, painted, etc.) to be the approximate color of the subject's skin. In an example, the adhesive material is a tape that is skin-colored. In some examples, the tape can be masking tape, packing tape, duct tape, surgical tape, Scotch/adhesive tape, electrical tape, cloth tape, etc. The side of the adhesive material that is facing out from the subject (regardless of whether the adhesive material is on the inner surface of the lens, the outer surface of the lens, or both) can be skin-colored. In an example, the side of the adhesive material that is facing the subject's ocular region (regardless of whether the adhesive material is on the front surface of the lens, the back surface of the lens, or both) can also be skin-colored. In another example, the side of the adhesive material that is facing the subject's eye area can be another color than skin color. In an example, the entire adhesive material can be skin-colored.

In some examples, the adhesive material used in occluder 104A can be an appropriately-sized, pre-cut film that can adhere to the lens with static electricity, water, etc. In some examples, the adhesive material used in occluder 104A can be a package of film that can adhere to the lens with static electricity, water, etc., and the package can include a sheet, roll, etc., from which multiple occluders 104A can be stamped-out, cut, etc. In various non-limiting examples, the adhesive material can be a laminate film made from polyethylene terephthalate (PET).

The non-adhesive side of the adhesive material can be made of one or more of copolymer plastic film, flatback paper, paper, polyethylene, polyethylene and crepe, polyethylene over cloth, vinyl, polypropylene, etc.

In various examples, the adhesion between the adhesive material and the lens can be permanent or semi-permanent. In some examples, the adhesive material can be formulated for removable adhesion to the lens. Removable or low-tack adhesion enables the adhesive material to be, in various examples, removed, repositioned, replaced, and/or washed. In an example, the adhesive material is vinyl. In examples, the adhesive material comprises low-tack vinyl. The vinyl can be a second-surface printable decal, which can be colored by printing with ink using a UV printer.

Figure 1B:
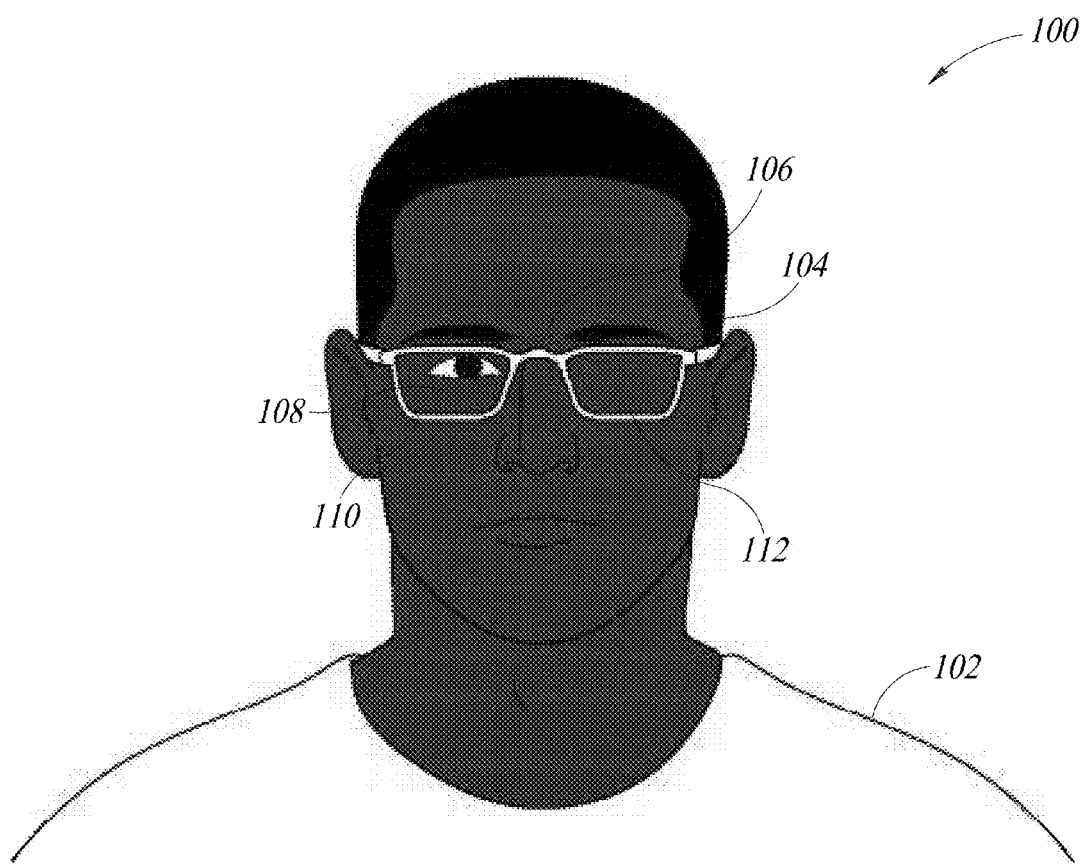
FIG. 1B is a color illustration of a front view of an occluder, according to various examples described herein, included in eyeglasses worn by a subject with a second skin color.

FIG. 1B is a color illustration 100B of a front view of an occluder, according to various examples described herein, included in eyeglasses worn by a subject with a second skin color. The second skin color (and the second color of the occluder 104B) is indicated by the difference in hatch marks as compared to FIG. 1A. In FIGS. 1B, 102B, 104B, 106B, 108B, 110B, and 112B correspond to 102A, 104A, 106A, 108A, 110A, and 112A in FIG. 1A, with the only difference being the skin color of subject 102B and the color of occluder 104B. The occluder described herein can be manufactured or dyed to match different skin colors so as to be as inconspicuous as possible on a given subject.

Figure 1C:
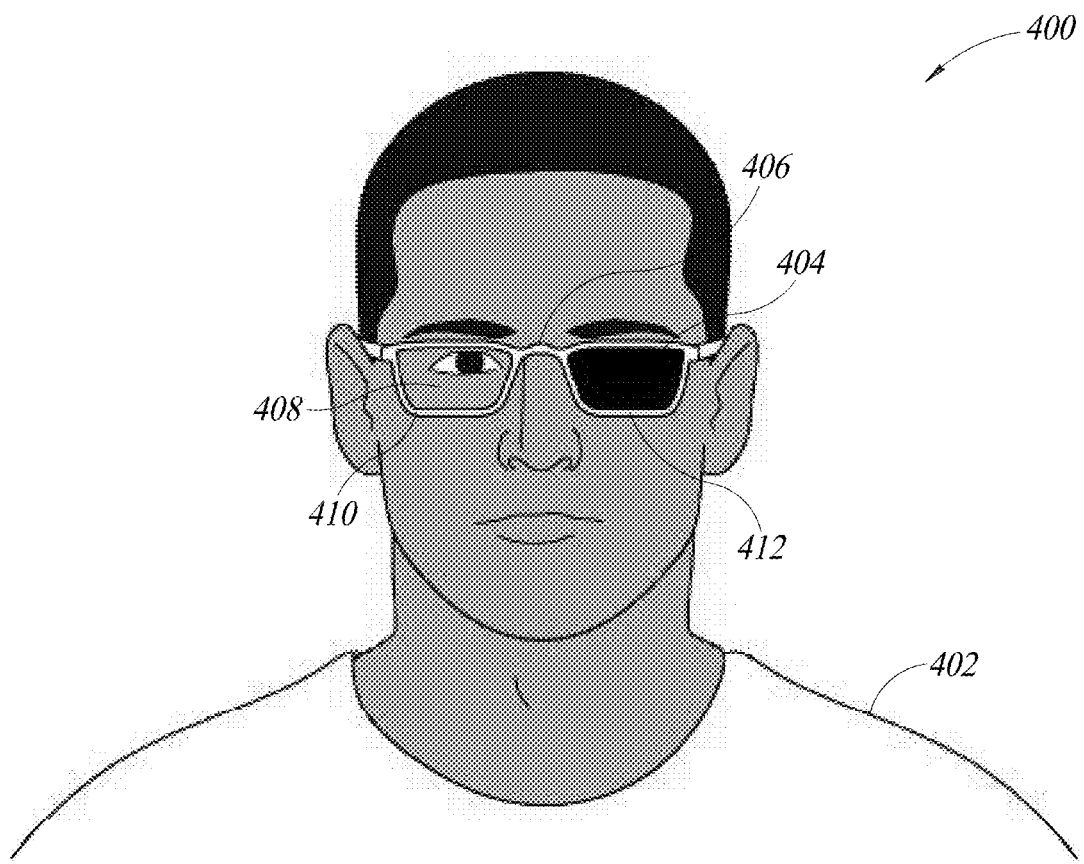
FIG. 1C is a color illustration of prior art.

FIG. 1C is a color illustration 100C of prior art. FIG. 1C is a front view of a black eye cover 104C as has conventionally been used to cover the ocular region. Black stands out from many if not all skin colors, and therefore the cover is conspicuous by not blending with the skin color of the ocular region. The conventional black eye cover draws attention to the subject's affected eye. In FIGS. 1C, 102C, 106C, 108C, 110C, and 112C correspond to 102A, 104A, 106A, 108A, 110A, and 112A in FIG. 1A, with the difference being what is covering the left eye.

Figure 2:
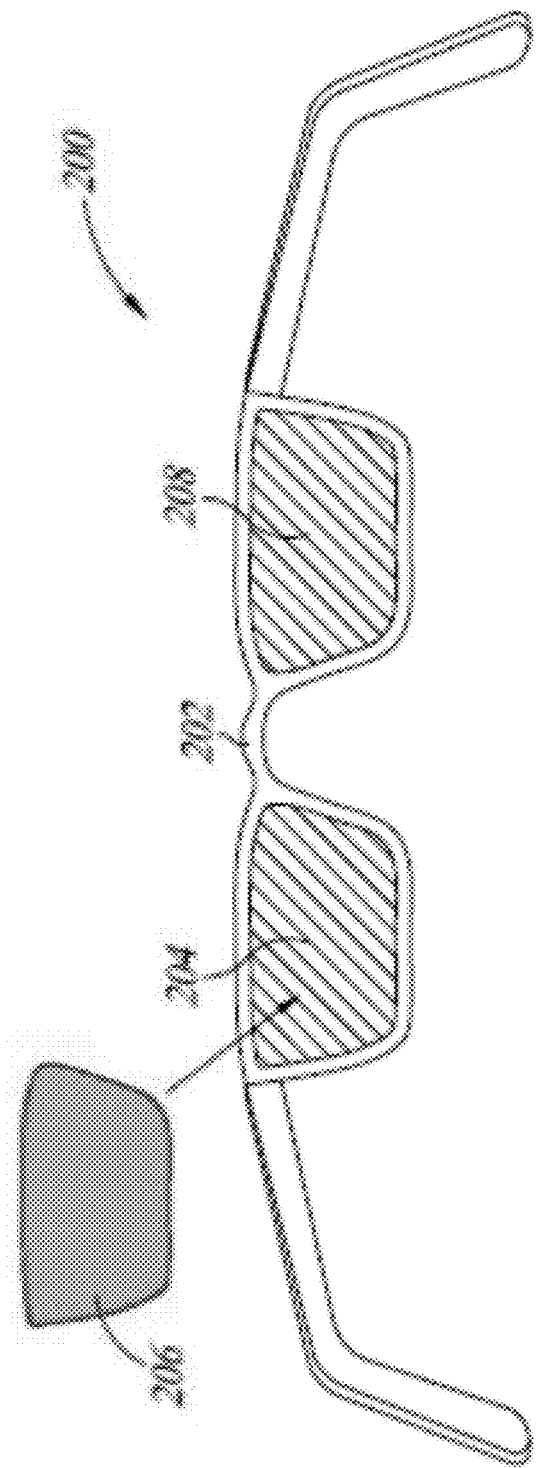
FIG. 2 is a color illustration of a rear view of an occluder, according to various examples described herein, included in eyeglasses, with the occluder in exploded view.

FIG. 2 is a color illustration 200 of a rear view of an occluder, according to various examples described herein, included in eyeglasses, with the occluder in exploded view.

In FIG. 2, left lens 204 and skin-colored adhesive material 206 together form an occluder (e.g., 104A, 104B, etc.) affixed in an eyeglass frame 202. Adhesive material 206 may be adhered to left lens 204 (adhesive material 206 may be adhered to either left lens 204 or right lens, 208, but in the example shown in FIG. 2, it is left lens 204). In examples, adhesive material 206 is removable, such that a user may apply adhesive material 206 to left lens 204 and later remove adhesive material 206 from left lens 204. In examples, adhesive material 206 may be reusable, so that it may be attached and detached multiple times.

Figure 3:
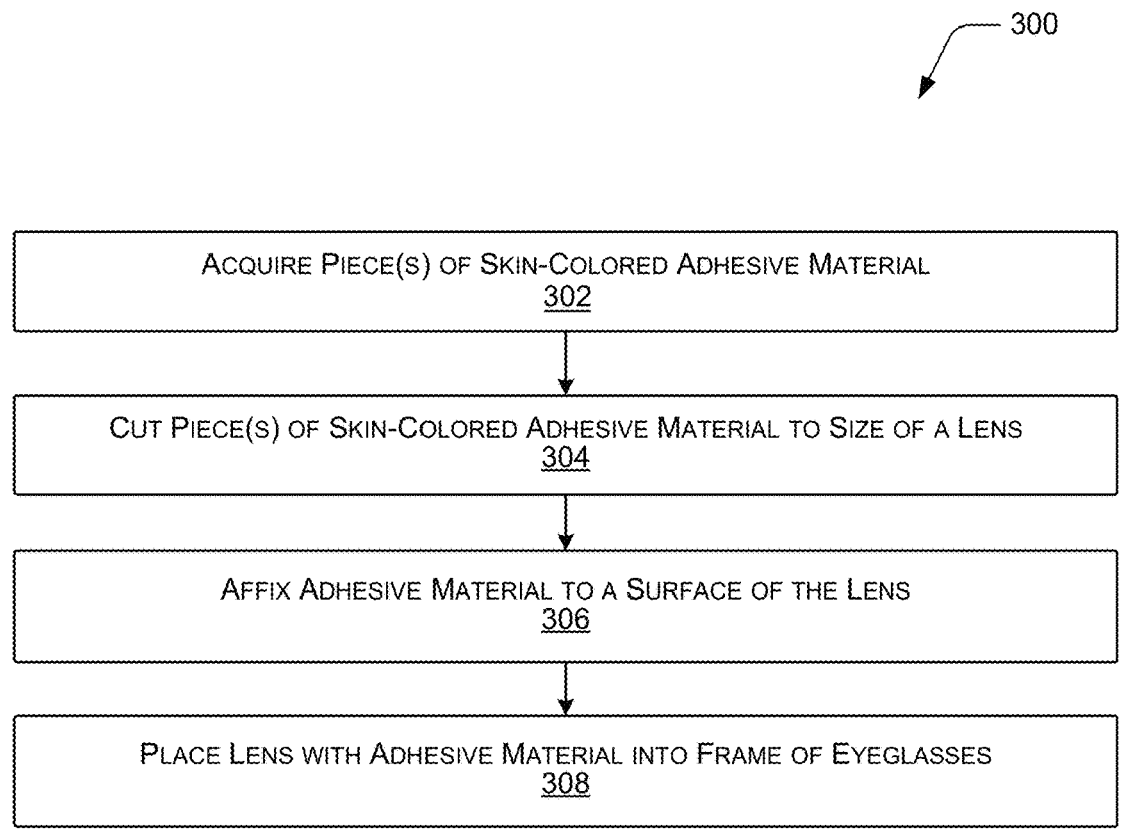
FIG. 3 is a flow diagram of an example method of making an occluder according to various examples described herein.

FIG. 3 is a flow diagram of an example method 300 of making an occluder according to various examples described herein. The method of FIG. 3 may be used to manufacture the occluder in FIG. 2 that comprises adhesive material 206 and left lens 204.

Block 302 illustrates obtaining skin-colored adhesive material. Skin-colored adhesive material can be purchased or manufactured from existing (or fabricated) adhesive material. Depending on a subject's particular skin color, commercially prepared adhesive material (e.g., masking tape, packing tape, duct tape, surgical tape, electrical tape, etc.) can approximate the subject's skin color without alteration of the material. In other examples, the color of an adhesive material can be altered with paint, markers, crayons, paper, ink, etc. The side of the adhesive material that is facing out from the subject (regardless of whether the adhesive material is on the inner surface of the lens, the outer surface of the lens, or both) can be skin-colored. In an example, the side of the adhesive material that is facing the subject's ocular region (regardless of whether the adhesive material is on the inner surface of the lens, the outer surface of the lens, or both) can also be skin-colored.

Block 304 illustrates cutting one or more pieces of the adhesive material to the size of the lens to be used in the occluder. The one or more pieces can be cut with scissors, a pen knife, a razorblade, or any other object that can cut through the adhesive material being used. In examples, the adhesive material is a size and shape that it is the size of the lens or larger. In such examples, a single piece of adhesive material can be used. In other examples, multiple pieces of adhesive material may be required to cover the surface area of the lens.

In block 306, the adhesive material, cut to size in block 304, can be affixed onto a surface of the lens. The adhesive material can be affixed on one or more of the outer surface or inner surface on the lens. One or more layers of the adhesive material can be affixed.

In block 308, the lens, with the adhesive material affixed, can be placed in the frame of eyeglasses.

Method 300 can optionally be repeated to cover the opposite surface of the lens as the one that was covered.

Figure 4A:
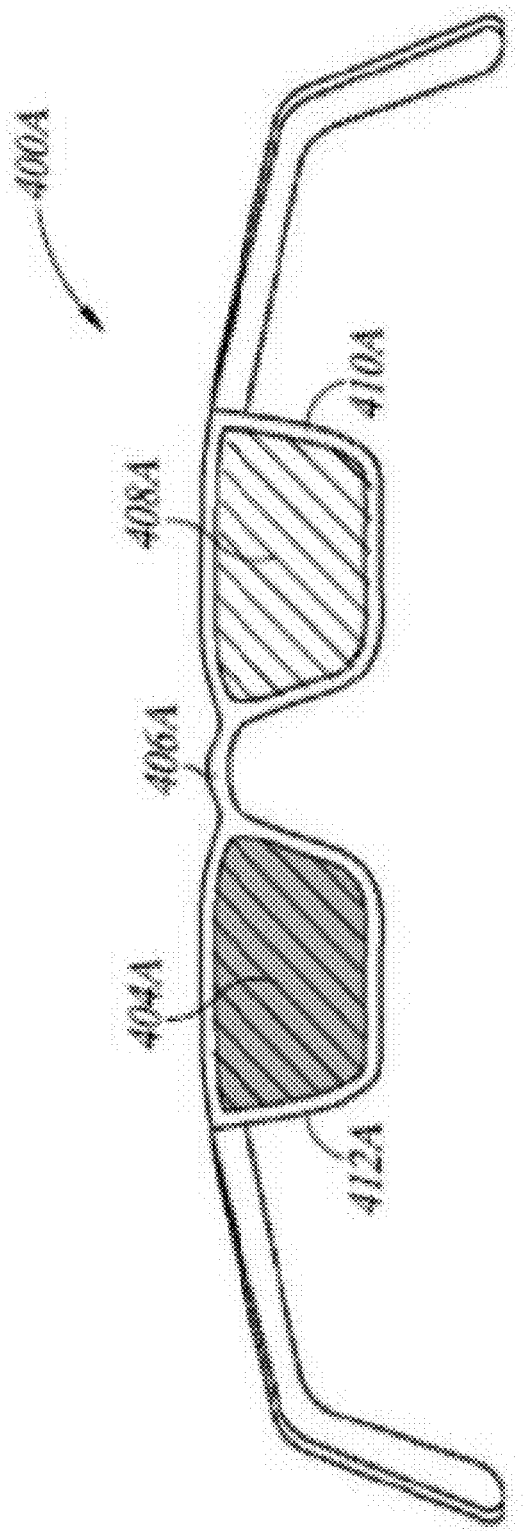
FIG. 4A is a color illustration of a rear view of an occluder comprising a first material, according to various examples described herein, included in eyeglasses.

FIG. 4A is a color illustration 400A of a rear view of an occluder comprising a first material, according to various examples described herein, included in eyeglasses. The occluder of FIG. 4A can be manufactured by chemically dying a lens made of a first material (e.g., polycarbonate, polyurethane, TRIVEX, high-index plastic, standard plastic, mid-index plastic, etc.) a color that substantially matches skin of an ocular region of a user rather than applying an adhesive material that substantially matches the skin of an ocular region of a user. Dyeing a lens can provide an occluder that is low-maintenance and has a long life. Eyeglass frame 406A includes a right rim 410A and a left rim 412A. Right rim 410A encloses a non-occluding lens 408A. Left rim 412A encloses occluder 404A. Occluder 404A comprises a lens made of a first material and a dyeing agent.

Figure 4B:
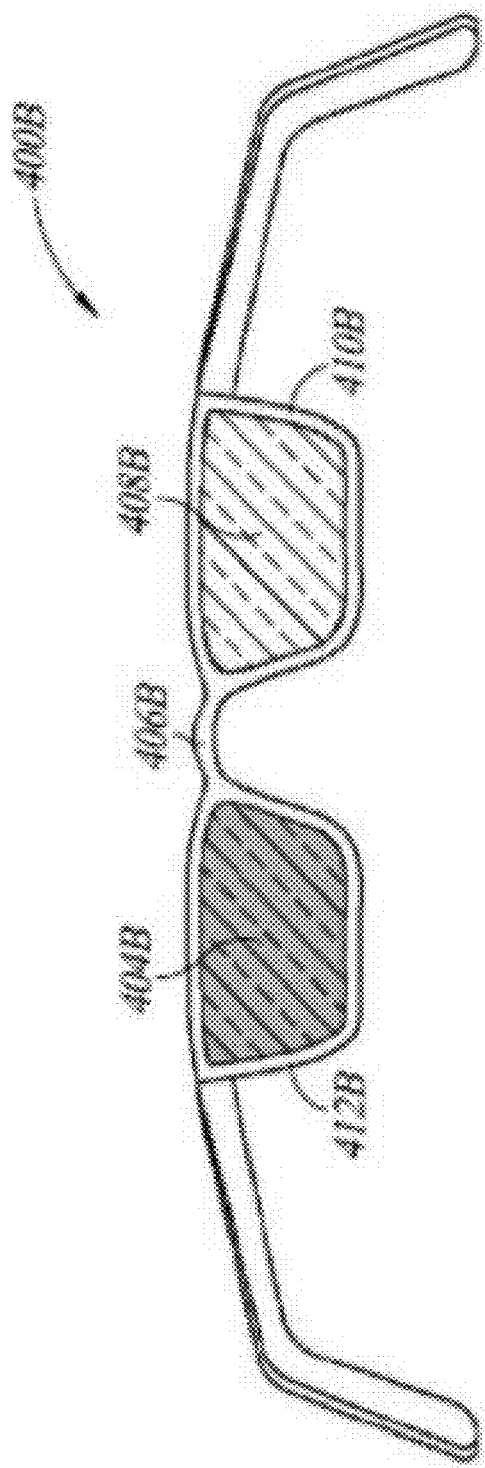
FIG. 4B is a color illustration of a rear view of an occluder comprising a second material, according to various examples described herein, included in eyeglasses.

FIG. 4B is a color illustration 400B of a rear view of an occluder comprising a second material, according to various examples described herein, included in eyeglasses. The occluder of FIG. 4B can be manufactured by chemically dying a lens made of a second material (e.g., polycarbonate, polyurethane, standard plastic, TRIVEX, high-index plastic, standard plastic, mid-index plastic, etc., that is other than the first material) rather than applying an adhesive material to a lens. Eyeglass frame 406B include a right rim 410B and a left rim 412B. Right rim 410B encloses a non-occluding lens 408B. Left rim 412B encloses occluder 404B. Occluder 404B comprises a lens made of a second material and a dyeing agent. The dyeing agent included in occluder 404B maybe the same dyeing agent as included in occluder 404A, or it may be a dyeing agent that differs (e.g., differs in type, quantity, chemical composition, color, etc.) from the dyeing agent in occluder 404A.

Figure 5:
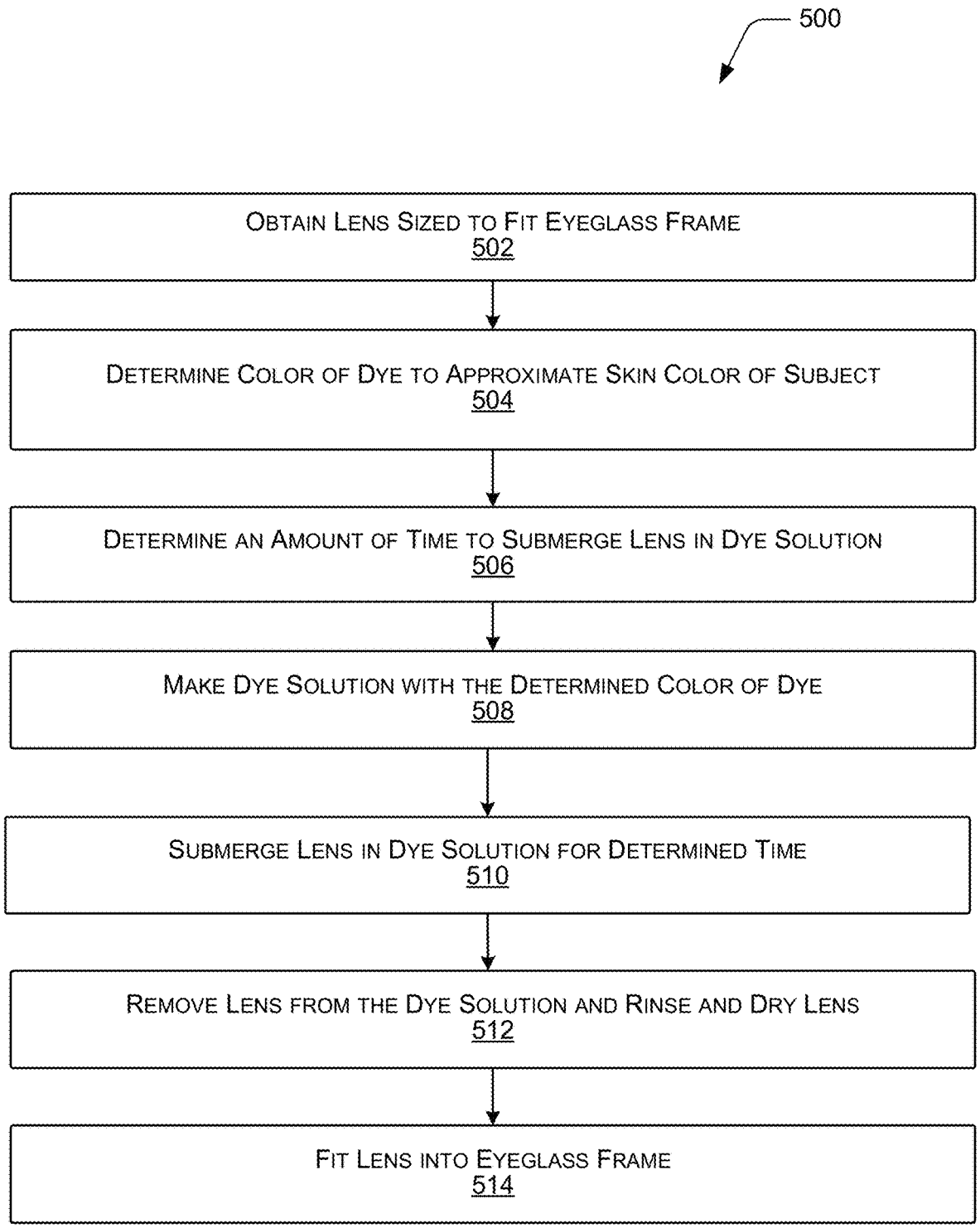
FIG. 5 is a flow diagram of an example method of making an occluder according to various examples described herein.

FIG. 5 is a flow diagram of an example method 500 of making an occluder according to various examples described herein. FIG. 5 illustrates the method 500 of making an occluder (for example, occluder 404A or occluder 404B) that includes a lens that has been colored using a chemical reaction or dyeing process, rather than by being covered with a colored adhesive material (as shown in FIGS. 3, 4A, and 4B). Method 300 and method 500 may be used together though each method alone is sufficient to make an occluder.

Block 502 illustrates obtaining a lens sized to fit an eyeglass frame (such as eyeglass frame 406A or 406B). The lens can be substantially transparent, semi-opaque, or opaque and can have existing color or be clear. The lens can be a lens removed from eyeglasses, or a lens that has not been used in eyeglasses.

Block 504 illustrates determining a color of dye to use that will result in an occluder that approximates the skin color of the subject. If the skin of a subject varies in color depending on the part of the subject's body, the skin color of the ocular region may be used as a basis of the dye color. Dye color may be approximated by comparing a user's skin color to sample occluders previously created with different colors of dye. Alternatively or additionally, a sample occluder can be dyed in the method described below to determine if it results in the proper color to be used for the subject. The color of skin can be approximated by using image or video editing software that identifies a color in an image of the subject based on the image's RBG or hexadecimal values. A user of the software can click an area that contains a color and the software can generate the color value(s). This value(s) can be applied in the same or other software to determine the dye and concentration of dye that can be used to approximate the subject's skin color.

In an example, the color of adhesive material, dye, paint, or other coloring agent can be based on established skin color types. For example, in making an approximation of skin color, reference can be made to the Fitzpatrick Classification of Skin Types I through VI, which classifies types of skin into six umbrella categories in the context of how a person's skin responds to the sun, but which also describes the colors of the skin types (e.g., palest, light brown, dark brown, etc.).

Block 506 illustrates determining an amount of time to submerge the lens in a dye solution. Generally, the longer a lens is in the dye solution, the darker the shade of the color. Certain colors can require longer amounts of time to dye the lens given the full spectrum of human skin colors, from fair to deep hues and light to dark shades.

Block 508 illustrates making a dye solution with the determined color of dye. The dye solution includes dye that is dissolved, combined, or mixed with other components of the dye solution. The dye solution can be heated for some or all of the amount of time. Ink (e.g., soy-based ink) may be included in the dye.

Block 510 illustrates submerging and/or suspending the lens in the dye solution for the determined amount of time. In examples, different lens materials that can be used with the occluder (e.g., polycarbonate, polyurethane, TRIVEX, high-index plastic, standard plastic, mid-index plastic, etc.) can use different methods of chemical coloring and absorb colors and coating with variable rates of effectiveness. In the example illustrated in block 510, a lens can be colored using a chemical process in which the lens is suspended in a chemical dye solution for a determined amount of time. While in the dye solution, the dye penetrates the lens surfaces. The dye can be any color (e.g., gray, green, rose, yellow, etc.), but dark gray or brown are contemplated as being more occlusive. The process can be used on most lens materials such as plastic (CR-39), high index, polycarbonate, and TRIVEX, but excluding glass. The lens can be submerged in more than one dye solution until the subject's skin color is achieved (e.g., red, yellow, and beige consecutively). In various examples, occluders as described herein can be made with CR-39 as the lens material and dyed with a chemical dyeing process. CR-39 allows for darker color, allowing it to be dyed more opaque than polycarbonate, because CR-39 binds to tints more easily and is more porous than other lens materials.

Block 512 illustrates removing the lens, now (with the dye) the occluder, from the dye solution and rinsing and drying the occluder.

Block 514 illustrates fitting the occluder into a rim of eyeglass frames.

Other methods for coloring lenses are also possible for the lenses included in the occluder described herein. In an example, coloring can be performed by vapor deposition, in which a lens is placed under vacuum and a high voltage passes through a coloring agent, vaporizing it into a gas. The gas is deposited on the lens. Moreover, a UV printer can print a coloring agent onto one or both surfaces of a lens. Another method of chemical coloring that can be used as the method of coloring lenses described herein is a constant density process, which is frequently used with glass and non-prescription lenses. This process uses the actual lens material (e.g., glass, plastic, polycarbonate, etc.) as the dyeing agent and results in the entire lens colored the same all the way through. Other contemplated methods to color glass include but are not limited to addition of coloring ions, precipitation of nanometer sized colloids, colored inclusions (as in milk glass and smoked glass), light scattering, or dichroic coatings. In another example, color can be applied to the surface of a lens without penetrating the surface by applying a colored coating to the surface. Polycarbonate lenses are conventionally colored by tinting their scratch coating.

In some examples, the occluder can be semi-transparent or semi-opaque. In other examples, the occluder can be opaque. In at least one example, a lens for the occluder described herein can be colored in a range of darkness from at least about 40% to at most about 100%, or from at least about 60% to at most about 95%, or from at least about 80% to at most about 90%. Because a goal of the current innovation is to block others' view of the eye area, higher percentages of darkness can be used than are used in other applications.

Buffing and/or scratching the tinted lens before or after the desired skin-color has been achieved, however fair or dark, prevents or substantially prevents others from seeing into the eye region. For fair to medium skin tones, in order to retain the lighter shades but still prevent viewing of the ocular region, buffing and/or scratching the lens surface can achieve the occlusive effect.

In some examples, the occluder described herein can combine coloring (via adhesive material or chemical dying) with photochromic features in the lenses. Photochromic lenses change color with exposure to certain types of intense light. Traditionally, photochromic lenses are configured to darken on exposure to ultraviolet (UV) radiation, and the photochromic lenses return to a clear state when that light is absent. In an example, a lens with adhesive material on the inside surface of the lens could be photochromic, so that the lens is skin-colored when indoors, and dark gray or black when outdoors. Meanwhile, the unaffected lens of the eyeglasses can also be photochromic, so that it also darkens in sync with the photochromic lens of the occluder. Then both lenses would turn dark outdoors, but transition back to a skin-colored lens and a clear lens when indoors.

In yet another example, an occluder as defined herein has two adjacent lenses, one atop the other. The outer lens is transparent and photochromic, and the inner lens can be dyed skin color or can have tape affixed to the inside surface. When indoors, the skin color of the inner lens would be seen (because the outer lens would be transparent) and the occluder would appear skin-colored, and when outdoors, the outer lens would darken, thereby making the occluder dark gray or black.

In various examples, lenses can be colored in combinations of the methods described above (e.g., chemical processes, adhesive material, painting, etc.).

In some examples, the occluder described herein can comprise not an optical lens, but an alternative hard material that can be clear or colored. That is, it can be unnecessary to use an optical lens in all applications as long as a lens-shaped object can be colored to approximate skin color.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more embodiments or examples of implementations.

The foregoing description sets forth specific examples of a device for occluding an ocular region that incorporates elements recited in the appended claims and related methods of making and using such compositions. The examples are described with specificity in order to meet statutory requirements. However, the description itself is not intended to limit the scope of this patent. Rather, the inventor has contemplated that the claimed features might also be embodied in other ways, to include different elements or combinations of elements equivalent or similar to the ones described in this document, in conjunction with other present or future technologies—the goal always being to provide a customized cosmetic solution by blending the color of the lens to each individual wearer's skin color.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular examples disclosed, but that such claimed subject matter can also include all embodiments falling within the scope of the appended claims, and equivalents thereof.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices, and methods, as shown and described herein. In any event, the structures, and devices, as well as the associated methods, described herein have many applications. Therefore, the disclosed subject matter should not be limited to any single example described herein, but rather should be construed in breadth and scope in accordance with the appended claims.

In the detailed description above, numerous specific details are set forth to provide a thorough understanding of claimed subject matter. However, it will be understood by those skilled in the art that claimed subject matter can be practiced without these specific details. In other instances, methods, apparatuses, or systems that would be known by one of ordinary skill have not been described in detail so as not to obscure claimed subject matter.

Reference throughout this specification to "one embodiment," "an embodiment," "one example," "an example," "various examples," or "some examples" means that a particular feature, structure, or characteristic described in connection with a particular example can be included in at least one embodiment of claimed subject matter. Thus, appearances of the phrase "in one embodiment," "in an embodiment," "in one example," "in an example," "in various examples," or "in some examples" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

Conditional language such as, among others, "can," "could," "might" or "may," unless specifically stated otherwise, are understood within the context to present that certain examples or embodiments include, while other examples or embodiments do not include, certain features, elements and/or steps. Thus, such conditional language is not generally intended to imply that certain features, elements and/or steps are in any way required for one or more examples or embodiments or that one or more examples or embodiments necessarily include logic for deciding, with or without user input or prompting, whether certain features, elements and/or steps are included or are to be performed in any particular example or embodiment. Conjunctive language such as the phrase "at least one of X, Y or Z," unless specifically stated otherwise, is to be understood to present that an item, term, etc., can be either X, Y, or Z, or a combination thereof

What is claimed is:

1. A method of making a device comprising:
obtaining a lens configured to fit into a rim corresponding to an eyeglass frame associated with a user;
determining one or more dyes that approximate a skin color of an ocular region of the user;
making a dye solution comprising the one or more dyes and water;
determining an amount of time to submerge the lens in the dye solution for the lens to approximate the skin color;
submerging the lens in the dye solution for the amount of time, resulting in a tinted lens;
removing the tinted lens from the dye solution;
rinsing the tinted lens;
drying the tinted lens; and
placing the tinted lens in the rim of the eyeglass frame.

2. The method as claim 1 recites, further comprising placing a second lens in a second rim of the eyeglass frame.

3. The method as claim 2 recites, wherein the second lens is at least one of corrected or photochromic.

4. The method as claim 2 recites, wherein the tinted lens and the second lens are photochromatic.

5. The method as claim 1 recites, wherein the tinted lens is semi-transparent, semi-opaque, or opaque.

6. The method as claim 1 recites, wherein the tinted lens is photochromic.

7. The method as claim 1 recites, wherein the tinted lens has a gradient coloring.

8. The method as claim 1 recites, further comprising buffing the tinted lens at least one of before submerging the lens or after drying the tinted lens.

9. The method as claim 1 recites, wherein submerging the lens in the dye solution comprises submerging the lens in a dye solution that has been heated.

10. The method as claim 1 recites, wherein determining the one or more dyes that approximate the skin color includes categorizing the skin color into one of a plurality of categories.

11. The method as claim 1 recites, wherein determining the one or more dyes that approximate the skin color comprises:
   using image or video editing software that identifies a color in an image of the user to generate a color value corresponding to the skin color, wherein the color value is based on RBG or hexadecimal values; and
   based at least in part on the color value, determine the one or more dyes that approximate the skin color.

12. A device to obscure an ocular region of a user comprising:
   a lens; and
   a material conformed with a shape of the lens and attached to at least one of the two sides of the lens, wherein the outward-facing side of the material is a color equivalent to a skin color associated with an ocular region of the user.

13. The device as claim 12 recites, wherein the material is removably attached to the at least one of the two sides of the lens via static electricity or water and the material can be reattached to the at least one of the two sides of the lens via static electricity or water.

14. The device as claim 13 recites, wherein the material comprises a second-surface decal, wherein colored ink is printed on the decal.

15. The device as claim 12 recites, wherein the material is attached to the side of the lens that will be closer to the face of the user when worn.

16. The device as claim 12 recites, wherein the material is dyed with soy-based inks.

17. The device as claim 12 recites, wherein the material is gradient in color and approximates variations in skin color in the ocular region.

18. The device as claim 12 recites, wherein the inward-facing side of the material is a different color than the outward-facing side of the material.

19. The device as claim 12 recites, wherein the material is semi-transparent, semi-opaque, or opaque.

20. A device to obscure an ocular region of a user, wherein the device comprises a lens that is at least one of (i) dyed via submersion in a dye solution to a color equivalent to a skin color associated with the ocular region of the user or (ii) coated to a color equivalent to the skin color associated with the ocular region of the user.

* * * * *